Feb. 16, 1965   C. M. COUTSOURAKIS   3,170,088
OVERLOAD PROTECTIVE DEVICE
Filed March 17, 1961

Constantine M. Coutsourakis,
INVENTOR.

BY

United States Patent Office 3,170,088
Patented Feb. 16, 1965

3,170,088
OVERLOAD PROTECTIVE DEVICE
Constantine M. Coutsourakis, 35 Columbus Ave.,
Tuckahoe, N.Y.
Filed Mar. 17, 1961, Ser. No. 96,621
3 Claims. (Cl. 317—22)
(Granted under Title 35, U.S. Code (1952), sec. 266)

The invention described herein may be manufactured by and for the Government for governmental purposes without the payment of any royalty thereon.

This invention relates to a protective device for overloads, and more particularly to an automatic transitorized protective overload device for use in electronic systems such, for example, as an airborne missile system.

Various devices are presently employed for overload protection in electronic circuits. Circuit breakers represent a common means for protecting electrical components and equipment from damage due to sudden overloads. In some situations, the circuit breaker may well be in the form of an automatic overload relay which must normally be reset manually. In many applications, however, where there is a need to reset the relay, it may not be easily accessible. The bimetallic strip is one means by which equipment may be turned on again after an overload. This device, however, will not act rapidly enough to protect modern sensitive transistor circuits.

It is therefore a primary object of this invention to provide a rapid acting, transistorized, protective overload device.

It is a further object of this invention to provide a protective overload device which will not only cut off the power delivered to an electric system in case of an overload or short circuit, but will also restore this power if the overload or short circuit should disappear.

It is yet a further object of this invention to provide a protective overload device which has a minimum number of components, which is compact in size and which is extremely reliable in operation.

Figure 1:
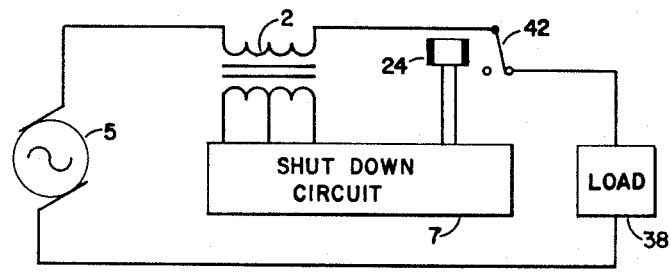
Figure 2:
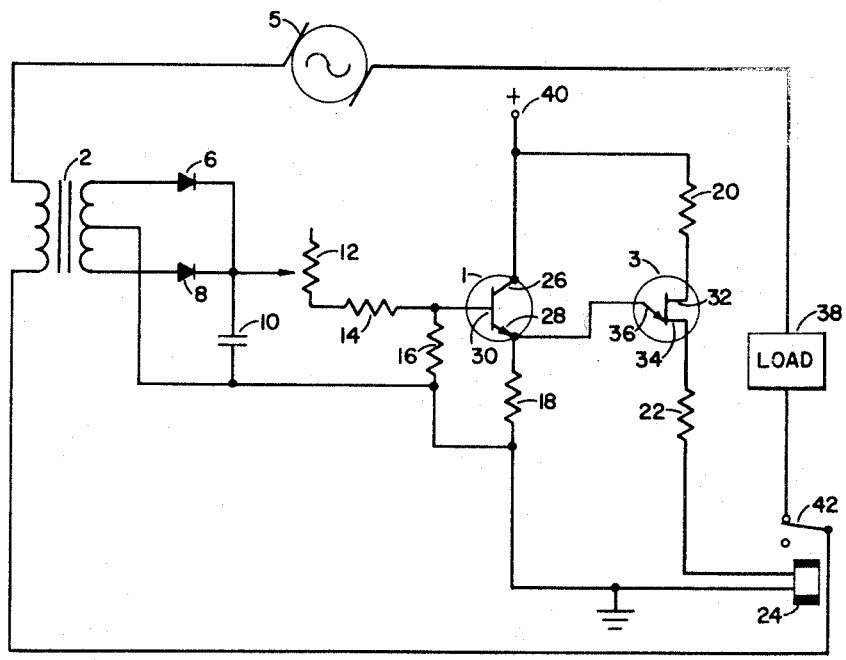

Other objects and advantages of this invention will become apparent from the description hereinafter following taken with the drawings in which:

FIGURE 1 illustrates a block diagram of an electronic system incorporating a protective overload device, and FIGURE 2 illustrates a schematic diagram of the embodiment shown in FIGURE 1.

In the present invention the overload protective device is also known in the art as a "shut down circuit" and will be referred to as such in the description that follows.

Referring to FIGURE 1, shut down circuit 7 is shown in relation to the over-all system. A power source 5 supplies a load 38 through the primary of current transformer 2 and through the normally closed relay contacts 42. The secondary of current transformer 2 supplies a stepped-up current responsive voltage for operation of shut down circuit 7. In case of an overload, shut down circuit 7 operates a relay 24 which opens contacts 42 and disconnects the load 38 from power source 5.

FIGURE 2 discloses a full schematic of shut down circuit 7 of FIGURE 1. An alternating current power source 5 is connected to the load 38 through the primary of current transformer 2 and the normally closed relay contacts 42. The voltage from the secondary of the stepped-up current transformer 2 is rectified by diodes 6 and 8 and filtered by condenser 10 to obtain a direct current in the conventional manner. This current flows through variable resistor 12 and current limiting resistor 14 to transistor 1. Variable resistor 12 may be adjusted to obtain a desired voltage at the base of transistor 1 while fixed resistor 14 limits the maximum current in order to protect transistor 1. Resistor 16 provides a return path for current to the center tap 24 of the secondary of transformer 2. Condenser 10, in conjunction with resistors 12, 14 and 16 also forms an R.C. time constant circuit as will be explained hereinafter. Transistor 1 has a base 30 connected to resistor 14, a collector 26 connected to the terminal 40 of a source of energizing potential, and an emitter 28 connected to the emitter 36 of a unijunction transistor 3 as well as through load resistor 18 to ground. The unijunction transistor 3 has one base 32 connected through load resistor 20 to the terminal of the source of energizing potential. The other base 34 is connected to ground through relay coil 24 and current limiting resistor 22. While transistor 1 is a common junction type transistor, transistor 3 is known as a unijunction transistor. The latter is unlike an ordinary transistor in that it has no inbetween points and thus assures a positive "on" or "off" state. Since the unijunction transistor provides a low impedance in the "on" state, transistor 1 acts as a load matching device to provide an impedance that will not effect the R.C. network on one side, and yet have a low enough impedance to provide sufficient current to feed transistor 3 when it is in the "on" state.

The operation of the device will now be described by assuming that an overload is delivered to the system. The heavy increase of current through the primary of transformer 2 results in an increased signal appearing at base 30 of transistor 1. This increased signal will be amplified by transistor 1 and will appear at emitter 36 of transistor 3. A certain value of voltage is needed at emitter 36 of transistor 3 in order to trigger this device to the "on" state. This value of voltage will be determined by the values of fixed resistors 20 and 22. The circuit is, of course, designed such that a sudden overload will produce a signal at emitter 36 of transistor 3 sufficient to trigger this device to the "on" state. When the necessary voltage is reached, transistor 3 will switch to the "on" state providing a low impedance through emitter 36 to base 34, and appreciable current will flow through transistors 1 and 3, resistor 22, and coil of relay 24. The contacts 42 of relay 24, which are normally closed will now open, shutting off the power to load 38. This in turn means that current will no longer flow in the primary of transformer 2 and hence no voltage will be generated across the secondary of transformer 2. If it were not for the R.C. time constant circuit consisting of condenser 10 and resistors 12, 14 and 16, the voltage at emitter 36 would soon drop below a certain value and the transistor 3 would switch to the "off" state. It should be noted that in order to switch transistor 3 to the "off" state, the value of voltage at emitter 36 must be dropped to a point considerably lower than that value needed to switch transistor 3 to the "on" state. The R.C. network thus functions to maintain a voltage at the base of emitter 30 by the discharge of condenser 10 through resistors 12, 14 and 16 to ground. This allows a few seconds to elapse before transistor 3 returns to the "off" state during which time the overload may disappear. When transistor 3 returns to the "off" state, current flow ceases through the coil of relay 24 and the contacts 42 close restoring power to load 38. If the overload no longer exists, power will continue to be delivered to the load. If the overload should return, the whole process would repeat itself. In the event of a continued overload, the time interval between the turn "on" and turn "off" state would be on the order of a few milliseconds, thus assuring no burnout of components in the system.

If a response is needed which is faster than that provided by relay 24, a transistorized switch may be substituted directly for relay 24. If direct current is being controlled, transformer 16 may be replaced by a small value of resistance.

It will be appreciated by those skilled in the art that other configurations are possible, and the foregoing specific examples of the specification should not be considered as limiting the device as described.

What is claimed is:

1. Apparatus for overload protection comprising a first source of voltage connected to supply a load which is to be protected; relay means having a solenoid coil and a pair of contacts; a current transformer having a primary winding and a secondary winding; said source, load, pair of contacts and primary winding being connected to each other in a first series circuit; said secondary winding of said current transformer connected to inputs of a R.C. time constant network by way of a rectifying means; outputs of said R.C. time constant network being connected across a base-emitter circuit of a first transistor; a unijunction transistor having an emitter and a pair of base electrodes; a second series circuit comprising said pair of base electrodes and said solenoid coil; a second source of voltage; said second source of voltages, said first transistor, and said second series circuit each being connected parallel to each other; and a direct connection between said emitters, whereby impedance of said first transistor will control firing of said unijunction transistor and therefore operation of said relay means.

2. An overload protection apparatus as set forth in claim 1, wherein said R.C. network comprises a capacitor and fixed and variable resistors connected in parallel relation between the base-emitter circuit; a junction between fixed and variable resistors being connected to the base electrode of said first transistor for maintenance of a voltage to the transistor during discharge of said capacitor through said resistors; and said capacitor being disposed to discharge responsive to cessation of the overload.

3. An overload protection apparatus as set forth in claim 2, wherein said current transformer has a secondary winding which is center tapped; said rectifying means comprises a pair of diodes provided with cathodes respectively connected to outside terminals of said secondary winding and with anodes connected to one side of said capacitor; and said center tap of the current transformer being connected to the other side of said capacitor.

References Cited by the Examiner

UNITED STATES PATENTS

| | | | |
|---|---|---|---|
| 2,966,979 | 1/61 | Zarling | 307—88.5 |
| 2,977,510 | 3/61 | Adamson | 317—33 |
| 3,112,412 | 11/63 | Dyer | 307—88.5 |

SAMUEL BERNSTEIN, *Primary Examiner.*